(12) United States Patent
Zhang et al.

(10) Patent No.: US 12,464,480 B2
(45) Date of Patent: Nov. 4, 2025

(54) METHOD AND APPARATUS FOR INITIAL ACCESS OF A USER EQUIPMENT

(71) Applicant: Lenovo (Beijing) Ltd., Beijing (CN)

(72) Inventors: Yuantao Zhang, Dongcheng District (CN); Hongmei Liu, Changping District (CN); Zhi Yan, Xicheng District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 236 days.

(21) Appl. No.: 17/921,742

(22) PCT Filed: Apr. 29, 2020

(86) PCT No.: PCT/CN2020/087816
§ 371 (c)(1),
(2) Date: Oct. 27, 2022

(87) PCT Pub. No.: WO2021/217503
PCT Pub. Date: Nov. 4, 2021

(65) Prior Publication Data
US 2023/0164715 A1 May 25, 2023

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0053* (2013.01); *H04L 27/2657* (2013.01); *H04W 48/10* (2013.01)

(58) Field of Classification Search
CPC .............. H04W 56/0015; H04W 48/10; H04L 5/0053; H04L 27/2657; H04L 5/0048;
(Continued)

(56) References Cited

U.S. PATENT DOCUMENTS

2019/0109700 A1  4/2019  Liu et al.
2019/0200307 A1  6/2019  Si et al.
(Continued)

FOREIGN PATENT DOCUMENTS

CA        3114564 A1    4/2020
CN      108809602 A    11/2018
(Continued)

OTHER PUBLICATIONS

PCT/CN2020/087816 , "International Preliminary Report on Patentability", PCT Application No. PCT/CN2020/087816, Nov. 10, 2022, 7 pages.
(Continued)

*Primary Examiner* — Rina C Pancholi
(74) *Attorney, Agent, or Firm* — FIG. 1 Patents

(57) ABSTRACT

Embodiments of the present application relate to a method and an apparatus for initial access of a user equipment (UE). According to an embodiment of the present application, a method can include: a method may include: detecting, at a first UE, a first synchronization signal block (SSB); determining whether a subcarrier offset value indicated by the first SSB is within a first range or a second range; and determining whether the first SSB has a valid access configuration for the first UE based on an indication in master system information (MIB) of the first SSB. Embodiments of the present application can facilitate the NR-Light UE to detect the initial access parameters, thereby implementation of the initial access procedure for the NR-Light UE.

20 Claims, 7 Drawing Sheets

(51) Int. Cl.
*H04L 27/26* (2006.01)
*H04W 48/10* (2009.01)

(58) Field of Classification Search
CPC ............... H04L 5/0091; H04L 27/2603; H04L 27/26136; H04L 27/2675; H04L 5/0023
See application file for complete search history.

(56) References Cited

U.S. PATENT DOCUMENTS

| | | | |
|---|---|---|---|
| 2019/0313437 | A1 | 10/2019 | Jung et al. |
| 2021/0274451 | A1* | 9/2021 | Lei ..................... H04W 76/10 |
| 2021/0377950 | A1* | 12/2021 | Takahashi ........... H04W 56/001 |

FOREIGN PATENT DOCUMENTS

| | | | |
|---|---|---|---|
| CN | 110035493 | A | 7/2019 |
| CN | 110521249 | A | 11/2019 |
| CN | 111801919 | A | 10/2020 |
| CN | 110603852 | A | 1/2021 |
| CN | 115136555 | A | 9/2022 |
| WO | 2019116477 | A1 | 6/2019 |
| WO | 2020032771 | A1 | 2/2020 |
| WO | 2020065862 | A1 | 4/2020 |
| WO | 2021173496 | A1 | 9/2021 |

OTHER PUBLICATIONS

PCT/CN2020/087816 , "International Search Report and Written Opinion", PCT Application No. PCT/CN2020/087816, Jan. 27, 2021, 9 pages.
Qualcomm Incorporated , "Remaining details on NR-PBCH", 3GPP TSG RAN WG1 Meeting AH 1801, R1-1800847, Vancouver, Canada [retrieved Oct. 26, 2022]. Retrieved from the Internet <https://www.3gpp.org/ftp/TSG_RAN/WG1_RL1/TSGR1_AH/NR_AH_1801/Docs>., Jan. 2018, 9 Pages.
20933191 , "Extended European Search Report", EP Application No. 20933191, Jan. 8, 2024, 11 pages.
"Foreign Office Action", CN Application No. 202080100223.9, Feb. 22, 2025, 22 pages.
Nokia, et al., "SS/PBCH blocks without RMSI—follow-up after RAN1 decisions", 3GPP TSG-RAN WG2 Meeting NR Adhoc 1807, R2-1810257, Montreal, Canada, Jul. 2-6, 2018. [Retrieved from the Internet] <https://www.3gpp.org/ftp/tsg_ran/wg2_rl2/TSGR2_AHs/2018_07_NR/Docs>, Jul. 2018, 3 pages.
"Foreign Office Action", CN Application No. 202080100223.9, Aug. 7, 2025, 28 pages.

* cited by examiner

METHOD AND APPARATUS FOR INITIAL ACCESS OF A USER EQUIPMENT

TECHNICAL FIELD

Embodiments of the present application generally relate to wireless communication technology, especially to a method and an apparatus for initial access of a user equipment (UE), e.g., a new radio (NR)-Light UE or a reduced capability UE.

BACKGROUND

In 3rd generation partnership project (3GPP) NR scenarios, a capability reduced NR device is introduced. The reduced capability NR device may also be referred to as a capability reduced UE or a NR-Light UE, which performs signal transmission, e.g. downlink (DL) transmission within a relatively narrow bandwidth (BW) (e.g. from a few Mbps to tens of Mbps), operating with low power consumption, few resources, and/or flexible latency requirement, etc.

Due to the relatively narrow bandwidth occupied by the NR-Light UE, some legacy parameters for initial access may be not detected by the NR-Light UE because these parameters may be transmitted in a bandwidth broader than that occupied by the NR-Light UE.

Therefore, the industry desires an improved technology for initial access at least in NR scenarios.

SUMMARY OF THE APPLICATION

Some embodiments of the present application at least provide a technical solution for initial access of UEs.

According to some embodiments of the present application, a method may include: detecting, at a UE, a first synchronization signal block (SSB); determining whether a subcarrier offset value indicated by the first SSB is within a first range or a second range; and determining whether the first SSB has a valid access configuration for the UE based on an indication in master system information (MIB) of the first SSB.

In an embodiment of the present application, the first range may be [24, 30] for frequency range 1 (FR1) or [12, 14] for frequency range 2 (FR2), while the second range is [0, 23] for FR1 or [0, 13] for FR2.

According to some other embodiments of the present application, a method may include: transmitting, a plurality of SSB including a first SSB, wherein the first SSB indicates a subcarrier offset value within a first range or a second range, and MIB in the first SSB comprises an indication indicating whether the first SSB has a valid configuration for the UE.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for initial access of UEs, e.g., NR-Light UEs. Accordingly, embodiments of the present application can facilitate the development and implementation of NR technology.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
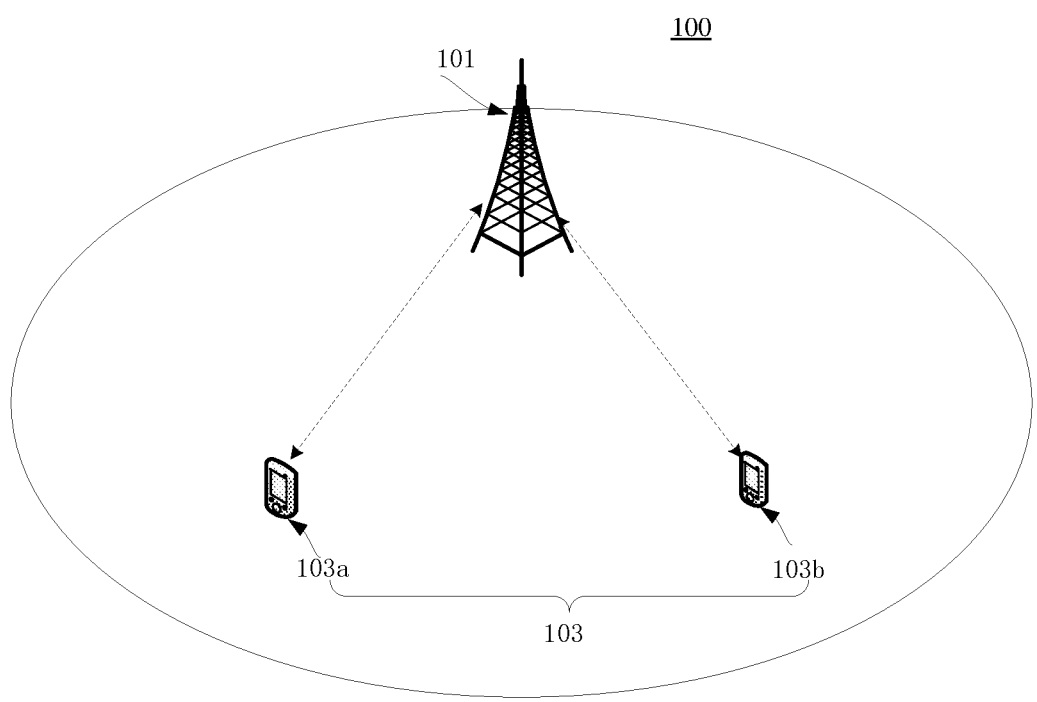
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and two UEs 103 (e.g., the first UE 103a and the second UE 103b) are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs 102. In some embodiments of the present application, each BS 102 may also be referred to as an access point, an access terminal, a base, a macro cell, a Node-B, an evolved Node B (eNB), a gNB, a Home Node-B, a relay node, a device, or described using other terminology used in the art.

The first UE 103a may be a legacy UE (or regular UE) compatible with existing technology, or a normal NR UE. For example, the first UE 103a may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the first UE 103a may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the first UE 103a may be a wearable device, such as a smart watch, a fitness band, an optical head-mounted display, or the like. Moreover, the first UE 103a may be referred to as a subscriber unit, a mobile, a mobile station, a user, a terminal, a mobile terminal, a wireless terminal, a fixed terminal, a subscriber station, a user terminal, or a device, or described using other terminology used in the art.

The second UE 103b may be a NR-Light UE or a capability reduced UE. The NR-Light UE may be an industrial wireless sensor, a video surveillance, a wearable device, or another device with the characteristics of NR-Light UE. Compared with a legacy UE, the NR-Light UE may have a smaller bandwidth to enable several Mbps to tens of Mbps downlink (DL) throughput; and achieve a lower power consumption to enable a longer UE battery life, cost reduction, reduced number of receiving/transmitting antennas, flexible latency requirement, flexible UE processing time, and flexible UE processing capability, etc. In some embodiments of the present application, all the at least one UE 103 may be a NR-Light UE.

Figure 2:
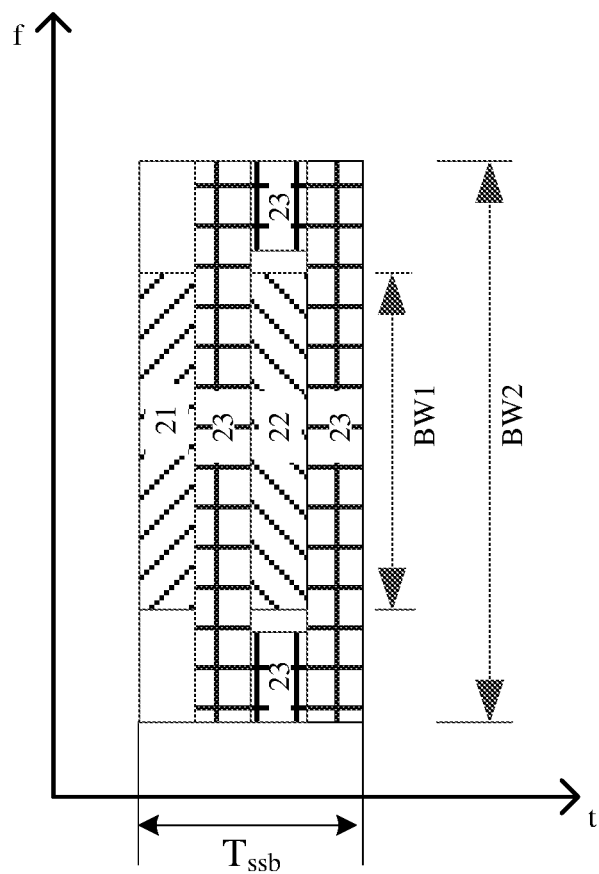
FIG. 2 illustrates an exemplary structure of a synchronization signal block (SSB) according to some embodiments of the present application.

The BS 101 may transmit synchronization information to the at least one UE 103 for initial accesses to the BS 101. The synchronization information may include one or more synchronization signal blocks (SSBs, or SS blocks) as shown in FIG. 2. Each SSB may be associated with information of a beam transmitted from the BS 101.

Specifically, FIG. 2 illustrates an exemplary structure of a SSB according to some embodiments of the present application.

According to FIG. 2, the horizontal axis "t" represents the time domain and the vertical axis "f" represents the frequency domain. The SSB may have a time length $T_{ssb}$ in the time domain, which is occupied by one or more orthogonal frequency division multiplexing (OFDM) symbols (for example, 4 OFDM symbols). In the frequency domain, the SSB may have a bandwidth BW2. BW2 may include one or more physical resource blocks (PRBs) (for example, 20 PRBs).

In some embodiments of the present application, the one or more OFDM symbols include a primary synchronization signal (PSS) 21, a secondary synchronization signal (SSS) 22, and a plurality of physical broadcast channels (PBCH) 23. Each of the PSS 21 and the SSS 22 may occupy a bandwidth BW1, which may be equal or less than the BW2 in the frequency domain. For example, BW1 may include 12 PRBs in the frequency domain. Each PBCH 23 may occupy all the bandwidth BW2 in the frequency domain.

Master system information (MIB) for initial accesses can be transmitted on the PBCH 23. The MIB information may include configuration information for a control resource set (CORESET), e.g., CORESET #0 and a search space (e.g., searchspace0) for initial accesses of UEs 103. CORESET #0 may indicate frequency resource(s) on which system information block1 (SIB1) information is transmitted.

When performing initial access, a UE may search required information on a synchronization raster or the like. The synchronization raster or the like may indicate the frequency position of the SSB that is used by the UE for DL synchronization and system information acquisition. As specified in 3GPP standard document TS38.101, the synchronization raster is globally defined for all frequencies and globally indexed by a global synchronization channel number (GSCN). The frequency position (e.g., absolute frequency domain position) of the SSB is defined as a reference frequency (e.g., $S_{SREF}$), which is associated with a corresponding GSCN. The frequency position of a SSB may also be referred to as SS block frequency position.

To perform the initial access to a cell, the UE 103 may first determine a SS block frequency position (e.g., $SS_{REF}$) based on the GSCN as defined in Table 1 or Table 2. In an embodiment of the present application, the mapping relationship between the $SS_{REF}$ and GSCN may be determined based on Tables 1 and 2 as shown below, wherein Tables 1 and 2 are respectively the same as Table 5.4.3.1-1 in TS38.101-1 and Table 5.4.3.1-1 in TS38.101-2 specified by 3GPP. Specifically, Table 1 is about a mapping relationship between the $SS_{REF}$ and GSCN for FR1 (e.g., 410 MHz-7125 MHz), and Table 2 is about a mapping relationship between the $SS_{REF}$ and GSCN for FR2 (e.g., 24250 MHz-52600 MHz).

TABLE 1 a mapping relationship between the $SS_{REf}$ and GSCN for FR1

| Frequency range | SS Block frequency position $SS_{REF}$ | GSCN | Range of GSCN |
|---|---|---|---|
| 0-3000 MHz | N * 1200 kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |

(Note 1):
The default value for operating bands with which only support subcarrier spacing (SCS) spaced channel raster(s) is M = 3.

TABLE 2 a mapping relationship between the $SS_{REf}$ and GSCN for FR2

| Frequency range | SS block frequency position $SS_{REF}$ | GSCN | Range of GSCN |
|---|---|---|---|
| 24250-100000 MHz | 24250.08 MHz + N * 17.28 MHz, N = 0:4383 | 22256 + N | 22256-26639 |

After determining the SS block frequency position, the UE may locate the SSB in the frequency domain based on the frequency position and a mapping rule between the SS block frequency position (e.g., $SS_{REF}$) and a resource element (RE) of the SSB.

Figure 3:
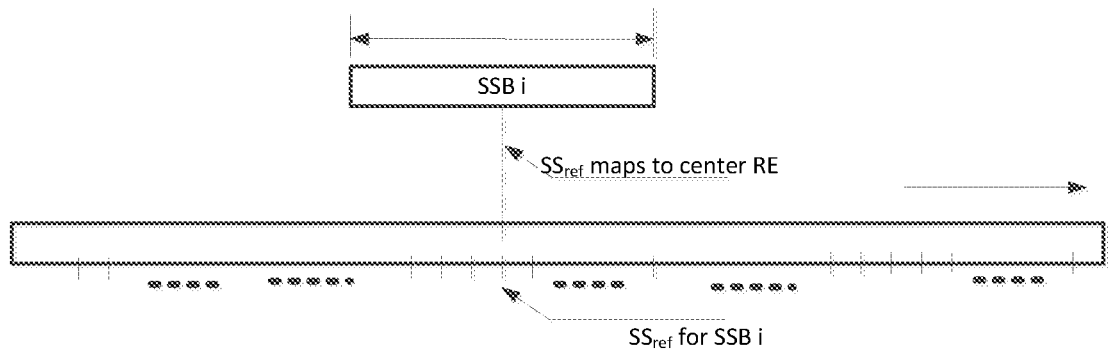
FIG. 3 illustrates an exemplary mapping rule between a SS block frequency position and a RE of a SSB according to some embodiments of the present application.

FIG. 3 illustrates an exemplary mapping rule between a SS block frequency position (e.g., $SS_{REF}$) and a RE of a SSB according to some embodiments of the present application. Referring to FIG. 3, the $SS_{REF}$ for a SSB i (i is an integer larger than or equal to zero) may map to a center RE of the SSB i. For example, assuming that the bandwidth BW2 of a SSB i includes 20 PRBs (i.e., 240 REs), the $SS_{REF}$ for the SSB i maps to RE 120 of the SSB i.

That is, when a UE 103 is power on, it may locate a first SSB to be detected according to the $SS_{REF}$ and the mapping rule between $SS_{REF}$ and a RE of the SSB. After locating the first SSB, the UE 103 may detect the first SSB to determine an access configuration required for performing initial access to a cell.

However, a detected SSB, e.g., the first SSB may not have an access configuration for the UE 103. Whether the first detected SSB has an access configuration for the UE 103 may be determined based on a subcarrier offset value (e.g., $k_{SSB}$) indicated by the SSB.

In an embodiment of the present application, for FR1, $k_{SSB}$ is indicated in the SSB by 5 bits, wherein the 4 least significant bits are given in MIB by a parameter ssb-SubcarrierOffset as specified in 3GPP standard documents, and the most significant bit is given by the fifth bit of the 8 bits introduced in the physical layer for PBCH of the SSB.

In an embodiment of the present application, for FR2, $k_{SSB}$ is indicated in the SSB by 4 bits, wherein all the 4 bits are given in MIB by a parameter ssb-SubcarrierOffset as specified in 3GPP standard documents.

After detecting a SSB, e.g., the first SSB, the UE 103 may first determine the subcarrier offset value indicated by the detected SSB to determine whether the first detected SSB has an access configuration for the UE 103. For different subcarrier offset values, the UE 103 may have different operations.

In the case that the subcarrier offset value (e.g., $k_{SSB}$) of the detected SSB is within a range [0, 23] for FR1 or a range [0, 11] for FR2, the UE 103 may determine that the MIB in the detected SSB include the access configuration for the UE 103, which may include control resource set configuration information for SIB1 scheduling and other configuration information for channel scheduling, for example, configuration information for random access request (RAR), retransmission of Msg3 in a random access procedure, Msg4 in a random access procedure, paging, etc. In an embodiment of the present application, the control resource set configuration information for SIB1 scheduling may refer to configuration information for CORESET #0. The UE 103 may camp on CORESET #0 and start to monitoring PDCCH for scheduling SIB1. In this case, the SSB may be referred to as a cell defining SSB, which has valid configurations for SIB1 reception.

In the case that the subcarrier offset value (e.g., $k_{SSB}$) of the detected SSB is within a range [24, 30] for FR1 or a range [12, 14] for FR2, the UE 103 may determine that the MIB in the detected SSB does not include access configuration for the UE 103, that is, the detected SSB cannot provide the control resource set configuration information (e.g., configuration information for CORESET #0) for SIB1 scheduling. In this case, the detected SSB is referred to as a SSB for measurement only. The UE 103 has to detect another SSB, e.g., a second SSB to find the valid access configuration for the UE 103.

For the second SSB, the UE 103 may determine a GSCN of the second SSB. The GSCN of the second SSB may be determined based on a GSCN of the first SSB (e.g. $N_{GSCN}^{Reference}$) and a GSCN offset value (e.g., $N_{GSCN}^{offset}$). For example, the GSCN of the second SSB may be defined as $N_{GSCN}^{Reference}+N_{GSCN}^{offset}$. In an embodiment of the present application, the GSCN offset value (e.g., $N_{GSCN}^{offset}$) may be determined based on the subcarrier offset value (e.g., $k_{SSB}$), control resource set configuration information (e.g., controlresourcesetzero or CORESET #0) and search space configuration information (e.g., searchspacezero or searchspace0) in the MIB of the first SSB.

For example, the mapping relationship between $N_{GSCN}^{offset}$ and $k_{SSB}$ and controlResourceSetZero and searchSpaceZero in MIB may be determined based on Tables 3 and 4 as shown below, wherein Tables 3 and 4 are respectively the same as Table 13-16 and Table 13-17 specified in 3GPP standard document TS38.213. Specifically, Table 3 is about a mapping relationship between $N_{GSCN}^{offset}$ and $k_{SSB}$ and controlResourceSetZero and searchSpaceZero in MIB for FR1 (e.g., 410 MHz-7125 MHz), and Table 4 is about a mapping relationship between $N_{GSCN}^{offset}$ and $k_{SSB}$ and controlResourceSetZero and searchSpaceZero in MIB for FR2 (e.g., 24250 MHz-52600 MHz).

TABLE 3 a mapping relationship between $N_{GSCN}^{offset}$ and $k_{SSB}$ and controlResourceSetZero and searchSpaceZero in MIB for FR1

| $k_{SSB}$ | 16 * controlresourcesetzero + searchspacezero | $N_{GSCN}^{offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

TABLE 4 a mapping relationship between $N_{GSCN}^{offset}$ and $k_{SSB}$ and controlResourceSetZero and searchSpaceZero in MIB for FR2

| $k_{SSB}$ | 16 * controlresourcesetzero + searchspacezero | $N_{GSCN}^{offset}$ |
|---|---|---|
| 12 | 0, 1, . . . , 255 | 1, 2, . . . , 256 |
| 13 | 0, 1, . . . , 255 | −1, −2, . . . , −256 |
| 14 | 0, 1, . . . , 255 | Reserved, Reserved, . . . , Reserved |

After determining the GSCN offset value, the UE 103 may determine the GSCN of the second SSB. For example, for FR1, assuming that the GSCN of the first SSB is 7499, $k_{SSB}$ is 24, 16*controlresourcesetzero+searchspacezero is 39, the UE 103 may determine that a GSCN offset value (e.g., $N_{GSCN}^{offset}$) is 40 and the GSCN of the second SSB is 7539. Then, the UE 103 may obtain the frequency position of the second SSB based on the GSCN of the second SSB. Similarly, after locating the second SSB, the UE 103 may detect the second SSB to determine the access configuration for performing initial access to a cell.

In the case that the subcarrier offset value (e.g., $k_{SSB}$) of a detected SSB is equal to 31 for FR1 or equal to 15 for FR2, the UE 103 may determine that there is no access configuration for the UE 103 in the SSB. In this case, the first SSB may be referred to as a SSB for measurement only.

For a NR-Light UE, its bandwidth may be higher than that of a SSB, which means the NR-Light UE could detect the SSB and acquire MIB information. However, the MIB defined for legacy UEs is not be optimized or even not feasible for NR-Light UEs. For example, CORESET #0 for SIB reception configured by a legacy MIB may have a broader bandwidth than the supported maximum bandwidth of NR-Light UEs. In this case, the NR-Light UEs may not be able to detect the downlink control information (DCI) transmitted in CORESET #0, and thus cannot obtain SIB1.

To solve the above problem, one method is restricting CORESET #0 configuration such that it always has a bandwidth equal to or lower than that of a NR-Light UE. However, this method is obviously not desirable for legacy UEs, and thus is not compatible with legacy technology. Another method is implicitly indicating CORESET #0 configuration for NR-Light UEs by CORESET #0 configuration in MIB for legacy UEs. However, this method cannot provide flexible configurations.

In another aspect, even if an access configuration for a legacy UE is determined, whether the legacy UE can access a cell still need to be determined based on a cellbarred parameter in current MIB. However, considering the compatibility between legacy UEs and NR-Light UEs, the cellbarred parameter cannot indicate the restriction of the access to the cell for these two types of UEs separately.

In addition, using the separated per-beam transmitted SSBs for NR-Light UEs means a higher overhead, which is especially not efficient when the network does not have many NR-Light UEs.

Based on these, it is beneficial that the network could have the flexibility to determine whether there should be a separated MIB for a NR-Light UE. Embodiments of the present application can provide technical solutions at least solving the above technical problems. More details on the embodiments of the present application will be illustrated in the following text in combination with the appended drawings.

Figure 4:
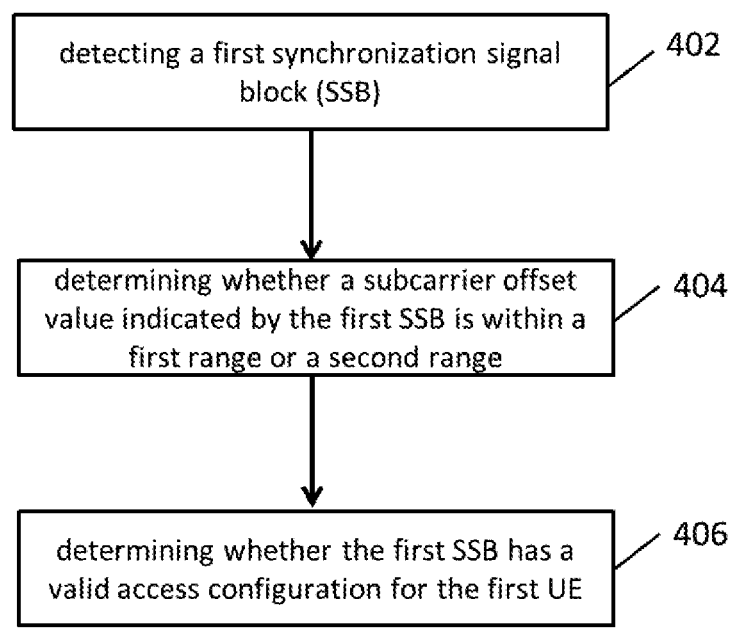
FIG. 4 is a flow chart illustrating a method for initial access of a UE according to some embodiments of the present application.

FIG. 4 is a flow chart illustrating a method for initial access of a UE according to some embodiments of the present application. The method may be performed by a legacy UE or the like, e.g., the first UE 103a; or a NR-Light UE or the like, for example, the second UE 103b as shown in FIG. 1.

As shown in FIG. 4, in step 402, a UE may detect a first SSB received from a BS (for example, the BS 101 as shown in FIG. 1). The first SSB is an SSB firstly located by the UE from a plurality of SSBs transmitted by the BS. For example, for the first SSB to be detected, the UE may first determine a frequency position of the first SSB according to the mapping relationship between the $SS_{REF}$ and GSCN as shown in Table 1 or Table 2. After determining the frequency position, the UE may locate the first SSB according to the $SS_{REF}$ and the mapping rule between $SS_{REF}$ and a RE of the first SSB as shown in FIG. 3. After locating the first SSB, the UE may detect the first SSB in the frequency range determined based on the frequency position and the mapping rule.

After detecting the first SSB, in step 402, the UE may determine whether a subcarrier offset value (e.g., $k_{SSB}$ as stated above) indicated by the first SSB is within a first range or a second range. In an embodiment of the present application, the first range is [24, 30] for FR1 or [12, 14] for FR2, while the second range is [0, 23] for frequency range 1 (FR1) or [0, 13] for frequency range 2 (FR2).

For example, for FR1, $k_{SSB}$ may be indicated by 5 bits in the first SSB, wherein the 4 least significant bits are given in the MIB of the first SSB by a parameter ssb-SubcarrierOffset as specified in 3GPP standard documents, and the most significant bit is given by the fifth bit of the 8 bits introduced in the physical layer for PBCH of the first SSB. For FR2, $k_{SSB}$ is indicated by 4 bits in the first SSB, wherein all the 4 bits are given in the MIB of the first SSB by a parameter ssb-SubcarrierOffset as specified in 3GPP standard documents.

In step 406, the UE may determine whether the first SSB has a valid access configuration for the UE based on an indication in MIB of the first SSB. In an embodiment of the present application, the valid access configuration for the UE may be the valid access configuration for SIB1 reception (e.g., control resource set configuration information and/or search space configuration information for SIB1 reception). For example, control resource set configuration information may refer to configuration information for CORESET #0 and search space configuration information may refer to configuration information for searchspace0. In an embodiment of the present application, the valid access configuration for the UE may be a cellbarred configuration, indicating if the UE is allowed to access the network. In another embodiment of the present application, the indication in MIB may be a 1-bit indication. In yet another embodiment of the present application, whether the first SSB has a valid access configuration for the UE may be indicated by a bit corresponding to a spare bit in a legacy MIB as specified in the existing 3GPP standard documents.

Although FIG. 4 illustrates that step 406 occurs after step 404, persons skilled in the art can understand that step 406 may occur before step 404 or simultaneously with step 404 according to some other embodiments of the present application.

In some cases, in response to that the subcarrier offset value is within the first range, the first SSB may be used for measurement only for a legacy UE (e.g., the first UE 103a in FIG. 1). That is, the legacy UE treats such a SSB as just for measurement and considers that the valid access configuration (e.g., control resource set configuration information and/or search space configuration information) for SIB1 reception is not present in the first SSB, and thus it may locate another SSB to acquire the valid access configuration for SIB1 reception. The UE will perform the following process in the same way as the legacy technology.

However, in this case that the subcarrier offset value is within the first range, whether the first SSB has a valid access configuration for a NR-Light UE (e.g., the second UE 130b in FIG. 1) may be further determined based on the indication in MIB.

According to some embodiments of the present application, in response to that the subcarrier offset value is within the first range and the indication indicates that the first SSB has the valid access configuration for a NR-Light UE, the NR-Light UE may detect control resource set configuration information (e.g., configuration information for CORESET #0) and search space configuration information (e.g., configuration information for searchspace0) for the NR-Light UE in the MIB of the first SSB and determine SIB1 for the NR-Light UE based on the control resource set configuration information and search space configuration information.

According to some embodiments of the present application, in response to that the subcarrier offset value is within the first range and the indication indicates that the first SSB has the valid access configuration for the NR-Light UE, the NR-Light UE may determine whether the NR-Light UE can access a cell based on a cellbarred parameter in the MIB. In an embodiment of the present application, in the case that cellbarred parameter in the MIB indicates that the NR-Light UE can access the cell, the NR-Light UE may detect control resource set configuration information and search space configuration information for the NR-Light UE in the MIB and determine a SIB1 for the NR-Light UE based on the control resource set configuration information and search space configuration information.

According to some embodiments of the present application, in response to that the subcarrier offset value is within the first range while the indication indicates that the first SSB does not have the valid access configuration for the NR-Light UE, the NR-Light UE may locate another SSB to be detected, i.e., a second SSB to acquire the valid access configuration for SIB1 reception based on GSCN of the first SSB and a first GSCN offset relative to the first SSB. The first GSCN offset may be determined based on a second GSCN offset and an additional GSCN offset.

According to some embodiments of the present application, the second SSB is from a set of SSBs that are dedicated for NR-light UEs. The number of SSBs in the set may be different from the number of SSBs in a SSB set for legacy UEs. There may be a mapping relationship between the SSBs for legacy UEs and the SSBs for NR-light UEs. In an embodiment of the present application, there may be a mapping relationship between the set of SSBs for legacy UEs and the set of SSBs for NR-light UEs. In another embodiment of the present application, there may be a mapping relationship of position of a SSB for legacy UEs and a SSB for NR-light UEs in time domain.

For the second SSB, the same procedure as stated above for the first SSB will be performed. For example, after detecting the second SSB, the NR-Light UE may determine the valid access configuration for the NR-Light UE from the second SSB. In an embodiment of the present application, in the case that a cellbarred parameter is configured in the MIB of the second SSB, before detecting control resource set configuration information and search space configuration information for the NR-Light UE in the MIB, the NR-Light UE may first detect the cellbarred parameter. In the case that the cellbarred parameter indicates that the NR-Light UE can access the cell, the NR-Light UE may detect control resource set configuration information and search space configuration information.

In an embodiment of the present application, the second GSCN offset is based on the subcarrier offset value and control resource set configuration information and search space configuration information in the MIB of the first SSB. For example, the second GSCN offset may be determined based on a mapping relationship between $N_{GSCN}^{offset}$ and $k_{SSB}$ and controlResourceSetZero and searchSpaceZero in MIB, as shown in Table 3 or Table 4.

In another embodiment of the present application, the additional GSCN offset has a predefined value.

Figure 5:
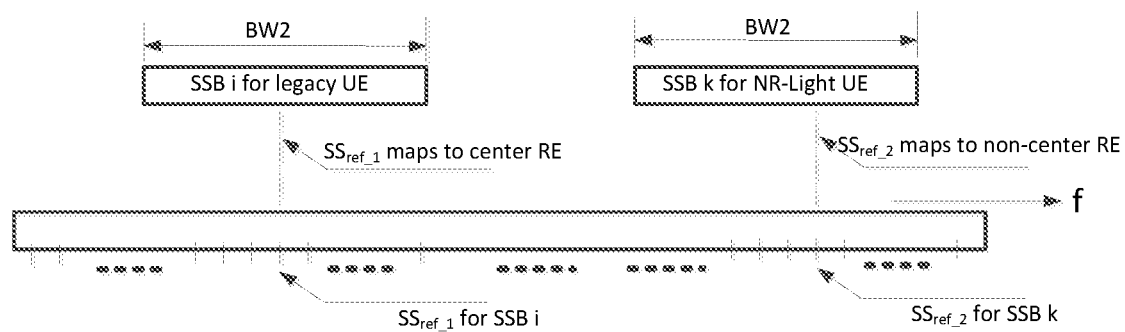
FIG. 5 illustrates an exemplary mapping rule between a SS block frequency position and a RE of a SSB according to some embodiments of the present application.

In yet another embodiment of the present application, the frequency position (i.e., $SS_{REF}$) of the cell defining SSB for NR-light UE maps to a non-center RE of the SSB. For example, for the second SSB as stated above, FIG. 5 illustrates an exemplary mapping rule between a SS block frequency position (e.g., $SS_{REF}$) and a RE of a SSB according to according to some other embodiments of the present application. Referring to FIG. 5, the $SS_{REF\_1}$ may be a frequency position of SSB i for a legacy UE (e.g., the first UE 103a), and the $SS_{REF\_1}$ may map to a center RE of the SSB i. In contrast, the $SS_{REF\_2}$ may be a frequency position of SSB k (k is an integer larger than zero) for a NR-Light UE (e.g., the second UE 103b), and the $SS_{REF\_2}$ may map to a non-center RE of the SSB k. For example, assuming that BW2 includes 20 PRBs (i.e., 240 REs), the $SS_{REF\_1}$ for a SSB i may map to RE 120 of the SSB i, while the $SS_{REF\_2}$ for a SSB k may map to RE r of the SSB k, wherein r is within a range of [0, 239] but not equal to 120.

That is, in order to locate a second SSB for detecting, the NR-Light UE may first determine the first GSCN offset based on the second GSCN offset and the additional GSCN offset. In an embodiment of the present application, the first GSCN offset may be the second GSCN offset plus the additional GSCN offset. After determining the first GSCN offset, the NR-Light UE may determine a GSCN of the second SSB based on the GSCN of the first SSB and the first GSCN offset. In an embodiment of the present application, the GSCN of the second SSB may be the GSCN of the first SSB plus the first GSCN offset. After determining the GSCN of the second SSB, the NR-Light UE may determine a frequency position of the second SSB according to the mapping relationship between the $SS_{REF}$ and GSCN as shown in Table 1 or Table 2. After determining the frequency position, the NR-Light UE may locate and detect the second SSB according to the $SS_{REF}$ and the mapping rule between $SS_{REF}$ and a RE of the SSB as shown in FIG. 5. Similar SSB locating methods can be used for locating yet another SSB when the UE still need to further locate a SSB for detecting to determine the valid access configuration.

In some other cases, the subcarrier offset value in the first SSB is within the second range. In response to that the subcarrier offset value is within the second range, the first SSB may be a cell defining SSB which has valid configurations for SIB1 reception for the legacy UE (e.g., the first UE 103a in FIG. 1). The UE will perform the following process in the same way as the legacy technology.

However, in this case that the subcarrier offset value is within the second range, whether the first SSB has a valid access configuration for the NR-Light UE (e.g., UE 130b in FIG. 1) still need to be further determined based on the indication in MIB of the first SSB.

According to some embodiments of the present application, in response to that the subcarrier offset value is within the second range and the indication indicates that the first SSB has the valid access configuration for the NR-Light UE, the NR-Light UE may detect control resource set configuration information (e.g., CORESET #0 configuration information) and search space configuration information (e.g., searchspace0 configuration information) in the MIB and determine SIB1 based on the control resource set configuration information and search space configuration information.

According to some embodiments of the present application, in response to that the subcarrier offset value is within the second range and the indication indicates that the first SSB has the valid access configuration for the NR-Light UE, the NR-Light UE may determine whether the NR-Light UE can access a cell based on a cellbarred parameter in the MIB. In an embodiment of the present application, in the case that cellbarred parameter in the MIB indicates that the NR-Light UE can access the cell, the NR-Light UE may detect control resource set configuration information and search space configuration information in the MIB and determine a SIB1 based on the control resource set configuration information and search space configuration information.

In some cases, the control resource set configuration information and search space configuration information in the MIB may be configured for the legacy UEs, and the indication indicates that the first SSB does not have the valid access configuration for the NR-Light UE so that the NR-Light UE will not detect SIB1 based the above information. According to some embodiments of the present application, in response to that the subcarrier offset value is within the second range while the indication indicates that the first SSB does not have the valid access configuration for the NR-Light UE, the NR-Light UE may detect a third SSB to acquire the valid access configuration for SIB1 reception based on GSCN of the first SSB and a third GSCN offset relative to the first SSB. After detecting the third SSB, the NR-Light UE may determine the valid access configuration for the NR-Light UE from the third SSB. In an embodiment of the present application, in the case that a cellbarred parameter is configured in the MIB of the third SSB, before detecting control resource set configuration information and search space configuration information for the NR-Light UE in the MIB, the NR-Light UE may first detect the cellbarred parameter. In the case that the cellbarred parameter indicates that the NR-Light UE can access the cell, the NR-Light UE may detect control resource set configuration information and search space configuration information.

In an embodiment of the present application, the frequency position of a third SSB maps to a non-center resource element (RE) of the third SSB. For example, the frequency position (i.e., $SS_{REF}$) of the third SSB may map to RE r of the third SSB as shown in FIG. 5.

The third GSCN can be located in a similar way to that for locating the second SSB. That is, in order to detect a third SSB, the NR-Light UE may first determine a GSCN of the third SSB based on the GSCN of the first SSB and the third GSCN offset. In an embodiment of the present application, the GSCN of the third SSB may be the GSCN of the first SSB plus the third GSCN offset. After determining the GSCN of the third SSB, the NR-Light UE may determine a frequency position of the third SSB according to the mapping relationship between the $SS_{REF}$ and GSCN as shown in Table 1 or Table 2. After determining the frequency position, the NR-Light UE may locate a third SSB according to the $SS_{REF}$ and the mapping rule between $SS_{REF}$ and a RE of the SSB as shown in FIG. 5. After locating the third SSB, the NR-Light UE may detect the third SSB in the frequency range of determined based on the frequency position and the mapping rule.

In an embodiment of the present application, the third GSCN offset (e.g., $N_{GSCN}^{offset}$) may be based on the subcarrier offset value (e.g., $k_{SSB}$) and control resource set configuration information (e.g., controlResourceSetZero) and search space configuration information (e.g., searchSpaceZero) in the MIB. For example, the third GSCN offset may be determined based on a mapping relationship between $N_{GSCN}^{offset}$ and $k_{SSB}$ and controlResourceSetZero and in MIB for NR-Light UEs, as shown in Table 5 or Table 6. Persons skilled in the art can understand that the mapping relationship in Table 5 or Table 6 is for illustrative only, $N_{GSCN}^{offset}$ and $k_{SSB}$ and controlResourceSetZero and in MIB may have other mapping relationships according to some other embodiments.

Specifically, Table 5 is about a mapping relationship between $N_{GSCN}^{offset}$ and $k_{SSB}$ and controlResourceSetZero and searchSpaceZero in MIB for FR1 (e.g., 410 MHz-7125 MHz) for NR-Light UEs, and Table 6 is about a mapping relationship between $N_{GSCN}^{offset}$ and $k_{SSB}$ and controlResourceSetZero and searchSpaceZero in MIB for FR2 (e.g., 24250 MHz-52600 MHz) for NR-Light UEs. For example, for FR1, assuming that $k_{SSB}$ is 0, 16*controlresource-setzero+searchspacezero is 0, then the NR-Light UE may determine that the third GSCN offset value (e.g., $N_{GSCN}^{offset}$) is 1.

TABLE 5 a mapping relationship between $N_{GSCN}^{offset}$ and $k_{SSB}$ and controlResourceSetZero and searchSpaceZero in MIB for FR1 for NR-Light UEs

| $k_{SSB}$ | 16 * controlresourcesetzero + searchspacezero | $N_{GSCN}^{offset}$ |
| --- | --- | --- |
| 0, 1, 2, 3 | 0, 1, . . . , 255 | 1, 2, . . . , 256 |
| 4, 5, 6, 7 | 0, 1, . . . , 255 | 257, 258, . . . , 512 |
| 8, 9, 10, 11 | 0, 1, . . . , 255 | 513, 514, . . . ,768 |
| 12, 13, 14, 15 | 0, 1, . . . , 255 | −1, −2, . . . , −256 |
| 16, 17, 18, 19 | 0, 1, . . . , 255 | −257, −258, . . . , −512 |
| 20, 21, 22, 23 | 0, 1, . . . , 255 | −513, −514, . . . , −768 |

TABLE 6 a mapping relationship between $N_{GSCN}^{offset}$ and $k_{SSB}$ and controlResourceSetZero and searchSpaceZero in MIB for FR2 for NR-Light UEs

| $k_{SSB}$ | 16 * controlresourcesetzero + searchspacezero | $N_{GSCN}^{offset}$ |
| --- | --- | --- |
| 0, 1, 2, 3, 4, 5 | 0, 1, . . . , 255 | 1, 2, . . . , 256 |
| 6, 7, 8, 9, 10, 11 | 0, 1, . . . , 255 | −1, −2, . . . , −256 |

According to some other embodiments of the present application, for NR, a wideband carrier may be divided into one or more subbands. Each subband may be referred to as a "bandwidth part (BWP)". In an embodiment of the present application, the indication in the MIB may indicate whether the NR-Light UE should turn to another BWP other than a BWP determined based on control resource set configuration information (e.g., configuration information for CORESET #0.) in the MIB to receive the valid access configuration for the NR-Light UE.

According to some other embodiments, a BS (e.g., BS 101 as shown in FIG. 1) may perform a method for initial access of a UE. The UE may be a legacy UE or the like, e.g., the first UE 103a or a NR-Light UE or the like, for example, the second UE 103b as shown in FIG. 1

For example, the BS 101 may transmit a plurality of SSB including a first SSB. The first SSB may indicate a subcarrier offset value (e.g., $k_{SSB}$ as stated above) within a first range or a second range. For example, for FR1, $k_{SSB}$ may be indicated by using 5 bits in the first SSB, wherein the 4 least significant bits are given in the MIB of the first SSB by a parameter ssb-SubcarrierOffset as specified in 3GPP standard documents, and the most significant bit is given by the fifth bit of the 8 bits introduced in the physical layer for PBCH of the first SSB. For FR2, $k_{SSB}$ is indicated by 4 bits in the first SSB, wherein all the 4 bits are given in the MIB of the first SSB by a parameter ssb-SubcarrierOffset as specified in 3GPP standard documents. In an embodiment of the present application, the first range is [24, 30] for FR1 or [12, 14] for FR2, while the second range is [0, 23] for frequency range 1 (FR1) or [0, 13] for frequency range 2 (FR2).

The MIB in the first SSB may include an indication indicating whether the first SSB has a valid access configuration for the NR-Light UE (e.g., UE 103b as shown in FIG. 1).

In an embodiment of the present application, the valid access configuration for the NR-Light UE may be the valid access configuration for SIB1 reception (e.g., control resource set configuration information and/or search space configuration information for SIB1 reception). For example, control resource set configuration information may refer to configuration information for CORESET #0 and search space configuration information may refer to configuration information for searchspace0.

In another embodiment of the present application, the indication in MIB may be a 1-bit indication. In yet another embodiment of the present application, whether the first SSB has a valid access configuration for the NR-Light UE may be indicated by using a bit corresponding to a spare bit in a legacy MIB as specified in the existing 3GPP standard documents.

According to some embodiments of the present application, for the subcarrier offset value being within the first range and the indication indicating that the first SSB has the valid access configuration for the NR-Light UE, the BS 101 may also transmit a cellbarred parameter in the MIB of the first SSB to indicate whether the NR-Light UE can access a cell.

According to some embodiments of the present application, for the subcarrier offset value being within the first range while the indication indicating that the first SSB has the valid access configuration for the NR-Light UE, the BS 101 may transmit control resource set configuration information and search space configuration information for the NR-Light in the MIB and configure a SIB1 for the NR-Light based on the control resource set configuration information and search space configuration information.

According to some embodiments of the present application, for the subcarrier offset value being within the first range and the indication indicating that the first SSB does not have the valid access configuration for the NR-Light UE, the BS 101 may transmit the valid access configuration for the NR-Light UE in a second SSB of the plurality of SSBs The valid access configuration may include control resource set configuration information (e.g., configuration information for CORESET #0) and search space configuration information (e.g., configuration information for searchspace0) for the NR-Light UE. The second SSB may be determined based on a GSCN of the first SSB and a first GSCN offset relative to the first SSB, and the first GSCN offset may be determined based on a second GSCN offset and an additional GSCN offset.

In an embodiment of the present application, the second GSCN offset is based on the subcarrier offset value and control resource set configuration information and search space configuration information in the MIB of the first SSB. For example, the second GSCN offset may be determined based on a mapping relationship between $N_{GSCN}^{offset}$ and $k_{SSB}$ and controlResourceSetZero and searchSpaceZero in MIB, as shown in Table 3 or Table 4.

In another embodiment of the present application, the additional GSCN offset has a predefined value.

In yet another embodiment of the present application, the frequency position (i.e., $SS_{REF}$) of the second SSB maps to a non-center RE of the second SSB. For example, the frequency position (i.e., $SS_{REF}$) of the second SSB may map to RE t of the second SSB as shown in FIG. 5.

According to some embodiments of the present application, for the subcarrier offset value being within the second range and the indication indicating that the first SSB has the valid access configuration for the NR-Light UE, the BS 101 may also transmit a cellbarred parameter in the MIB to indicate whether the NR-Light UE can access a cell.

According to some embodiments of the present application, for the subcarrier offset value being within the second range and the indication indicating that the first SSB has the valid access configuration for the NR-Light UE, the BS 101 may transmit control resource set configuration information and search space configuration information in the MIB and configure a SIB1 for based on the control resource set configuration information and search space configuration information. In some cases, the control resource set configuration information and search space configuration information in the MIB may be configured for legacy UEs.

According to some embodiments of the present application, for the subcarrier offset value being within the second range and the indication indicating that the first SSB does not have the valid access configuration for the NR-Light UE, the BS 101 may transmit the valid access configuration for the NR-Light UE in a third SSB of the plurality of SSBs The valid access configuration may include control resource set configuration information (e.g., configuration information for CORESET #0) and search space configuration information (e.g., configuration information for searchspace0) for the NR-Light UE. The third SSB may be determined based on a GSCN of the first SSB and a third GSCN offset relative to the first SSB.

In an embodiment of the present application, the third GSCN offset (e.g., $N_{GSCN}^{offset}$) may be based on the subcarrier offset value (e.g., $k_{SSB}$) and control resource set configuration information (e.g., controlResourceSetZero) and search space configuration information (e.g., searchSpaceZero) in the MIB. For example, the third GSCN offset may be determined based on a mapping relationship between $N_{GSCN}^{offset}$ and $k_{SSB}$ and controlResourceSetZero and in MIB for NR-Light UEs, as shown in Table 5 or Table 6.

In another embodiment of the present application, the frequency position (i.e., $SS_{REF}$) of the third SSB may map to a non-center RE of the third SSB. For example, the frequency position (i.e., $SS_{REF}$) of the third SSB may map to RE r of the third SSB as shown in FIG. 5.

According to some other embodiments of the present application, for NR, a wideband carrier may be divided into one or more subbands. Each subband may be referred to as a "bandwidth part (BWP)". In an embodiment of the present application, the indication I the MIB may indicate whether the NR-Light UE should turn to another BWP other than a BWP determined based on control resource set configuration information (e.g., configuration information for CORESET #0.) in the MIB to receive the valid access configuration for the NR-Light UE.

Figure 6:
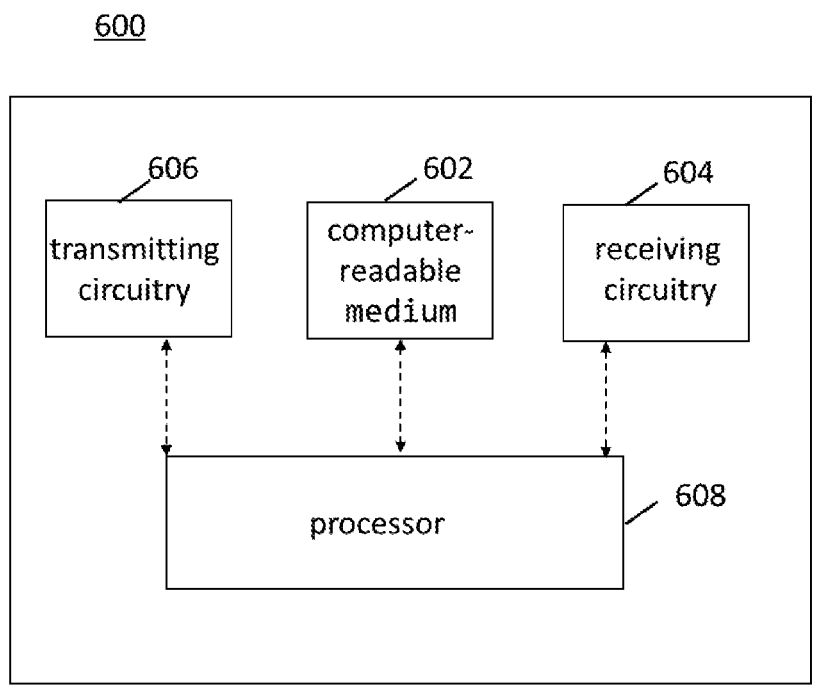
FIG. 6 illustrates a simplified block diagram of an apparatus 600 for initial access of a UE according to some embodiments of the present application.

FIG. 6 illustrates a simplified block diagram of an apparatus 600 for initial access of a UE according to some embodiments of the present application. The apparatus 600 may be a UE 103 as shown in FIG. 1.

Referring to FIG. 6, the apparatus 600 may include at least one non-transitory computer-readable medium 602, at least one receiving circuitry 604, at least one transmitting circuitry 606, and at least one processor 608. In some embodiment of the present application, at least one receiving circuitry 604 and at least one transmitting circuitry 606 and be integrated into at least one transceiver. The at least one non-transitory computer-readable medium 602 may have computer executable instructions stored therein. The at least one processor 608 may be coupled to the at least one non-transitory computer-readable medium 602, the at least one receiving circuitry 604 and the at least one transmitting circuitry 606. The computer executable instructions can be programmed to implement a method with the at least one receiving circuitry 604, the at least one transmitting circuitry 606 and the at least one processor 608 The method can be a method according to an embodiment of the present application, for example, the method shown in FIG. 4.

Figure 7:
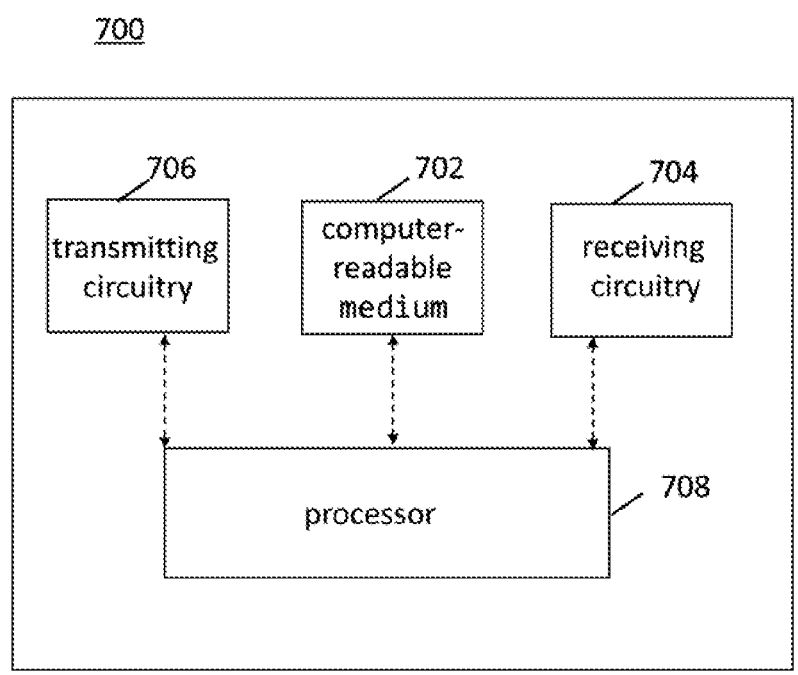
FIG. 7 illustrates a simplified block diagram of an apparatus 700 for initial access of a NR-Light UE according to some other embodiments of the present application.

FIG. 7 illustrates a simplified block diagram of an apparatus 700 for initial access of a NR-Light UE according to some other embodiments of the present application. The apparatus 700 may be a BS 101 as shown in FIG. 1.

Referring to FIG. 7, the apparatus 700 may include at least one non-transitory computer-readable medium 702, at least one receiving circuitry 704, at least one transmitting circuitry 706, and at least one processor 708. In some embodiment of the present application, at least one receiving circuitry 704 and at least one transmitting circuitry 706 and be integrated into at least one transceiver. The at least one non-transitory computer-readable medium 702 may have computer executable instructions stored therein. The at least one processor 708 may be coupled to the at least one non-transitory computer-readable medium 702, the at least one receiving circuitry 704 and the at least one transmitting circuitry 706. The computer executable instructions can be programmed to implement a method with the at least one receiving circuitry 704, the at least one transmitting circuitry 706 and the at least one processor 708.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:
 at least one memory; and
 at least one processor coupled with the at least one memory and operable to cause the UE to:
  detect, at the UE, a first synchronization signal block (SSB);
  determine whether a subcarrier offset value indicated by the first SSB is within a first range or a second range, wherein the first range is [24, 30] for frequency range 1 (FR1) or [12, 14] for frequency range 2 (FR2), and the second range is [0, 23] for FR1 or [0, 13] for FR2;
  determine whether the first SSB has a valid access configuration for the UE based on an indication in system information of the first SSB, wherein the indication indicates whether access configuration information included in the SSB is for reduced capability UEs;
  in response to the subcarrier offset value being within the first range and the indication indicating that the first SSB does not have the valid access configuration for the UE, detect a second SSB based on a global synchronization channel number (GSCN) of the first SSB and a first GSCN offset relative to the first SSB, wherein:
   the first GSCN offset is determined based on a second GSCN offset and an additional GSCN offset,
   the second GSCN offset is based on the subcarrier offset value and control resource set configuration information and search space configuration information in the system information of the first SSB,
   the additional GSCN offset has a predefined value, and
   a frequency position of the second SSB maps to a non-center resource element (RE) of the second SSB; and
  determine the valid access configuration for the UE from the second SSB.

2. The UE of claim 1, wherein, in response to that the subcarrier offset value is within the first range and the indication indicates that the first SSB has the valid access configuration for the UE, the at least one processor is operable to cause the UE to:
 determine whether the UE can access a cell based on a cellbarred parameter in the system information.

3. The UE of claim 1, wherein, in response to that the subcarrier offset value is within the first range and the indication indicates that the first SSB has the valid access configuration for the UE, the at least one processor is operable to cause the UE to:
  detect control resource set configuration information and search space configuration information for the UE in the system information; and
  determine a system information block1 (SIB1) for the UE based on the control resource set configuration information and search space configuration information.

4. The UE of claim 1, wherein, in response to that the subcarrier offset value is within the second range and the indication indicates that the first SSB has the valid access configuration for the UE, the at least one processor is operable to cause the UE to:
  determine whether the UE is able to access a cell based on a cellbarred parameter in the system information.

5. The UE of claim 1, wherein, in response to that that the subcarrier offset value is within the second range and the indication indicates that the first SSB does not have the valid access configuration for the UE, the at least one processor is operable to cause the UE to:
  detect a third SSB based on the GSCN of the first SSB and a third GSCN offset of the third SSB relative to the first SSB; and
  determine the valid access configuration for the UE from the third SSB.

6. The UE of claim 5, wherein the third GSCN offset is based on the subcarrier offset value and control resource set configuration information and search space configuration information in the system information.

7. The UE of claim 5, wherein a frequency position of the third SSB maps to a non-center resource element (RE) of the third SSB.

8. A base station, comprising:
  at least one memory; and
  at least one processor coupled with the at least one memory and operable to cause the base station to:
    transmit a plurality of synchronization signal blocks (SSBs) including a first SSB and a second SSB, wherein:
      the first SSB indicates a subcarrier offset value within a first range or a second range,
      the first range is [24, 30] for frequency range 1 (FR1) or [12, 14] for frequency range 2 (FR2) and the second range is [0, 23] for FR1 or [0, 13] for FR2, and
      system information in the first SSB comprises an indication of whether the first SSB has a valid access configuration for a user equipment (UE), the indication indicating whether access configuration information included in the SSB is for reduced capability user equipment (UEs); and
    determine, in response to the subcarrier offset value being within the second range and the indication indicating that the first SSB does not have the valid access configuration for the UE, the second SSB based on a global synchronization channel number (GSCN) of the first SSB and a second GSCN offset of the second SSB relative to the first SSB, wherein:
      the second GSCN offset is based on the subcarrier offset value and control resource set configuration information and search space configuration information in the system information of the first SSB, and
      the second SSB includes the valid access configuration for the UE.

9. The base station of claim 8, wherein, for the subcarrier offset value being within the first range and the indication indicating that the first SSB has the valid access configuration for the UE, the at least one processor is operable to cause the base station to:
  transmit a cellbarred parameter in the system information to indicate whether the UE can access a cell.

10. The base station of claim 8, wherein, for the subcarrier offset value being within the first range and the indication indicating that the first SSB has the valid access configuration for the UE, the at least one processor is operable to cause the base station to:
  transmit control resource set configuration information and search space configuration information for the UE in the system information; and
  configure a system information block1 (SIB1) for the UE based on the control resource set configuration information and search space configuration information.

11. The base station of claim 8, wherein, for the subcarrier offset value being within the first range and the indication indicating that the first SSB does not have the valid access configuration for the UE, the at least one processor is operable to cause the base station to:
  transmit the valid access configuration for the UE in a third SSB of the plurality of SSBs,
  wherein the third SSB is determined based on a global synchronization channel number (GSCN) of the first SSB and a first GSCN offset relative to the first SSB, and wherein the first GSCN offset is determined based on a third GSCN offset and an additional GSCN offset.

12. The base station of claim 11, wherein:
  the third GSCN offset is based on the subcarrier offset value and control resource set configuration information and search space configuration information in a master information block (MIB) of the first SSB;
  the additional GSCN offset has a predefined value; and
  a frequency position of the second SSB maps to a non-center resource element (RE) of the third SSB.

13. The base station of claim 8, wherein a frequency position of the second SSB maps to a non-center resource element (RE) of the second SSB.

14. A method performed by a user equipment (UE), the method comprising:
  detecting a first synchronization signal block (SSB);
  determining whether a subcarrier offset value indicated by the first SSB is within a first range or a second range, wherein the first range is [24, 30] for frequency range 1 (FR1) or [12, 14] for frequency range 2 (FR2), and the second range is [0, 23] for FR1 or [0, 13] for FR2;
  determining whether the first SSB has a valid access configuration for the UE based on an indication in system information of the first SSB, wherein the indication indicates whether access configuration information included in the SSB is for reduced capability UEs;
  in response to the subcarrier offset value being within the first range and the indication indicating that the first SSB does not have the valid access configuration for the UE, detecting a second SSB based on a global synchronization channel number (GSCN) of the first SSB and a first GSCN offset relative to the first SSB, wherein:
    the first GSCN offset is determined based on a second GSCN offset and an additional GSCN offset,
    the second GSCN offset is based on the subcarrier offset value and control resource set configuration information and search space configuration information in the system information of the first SSB, the additional GSCN offset has a predefined value, and
a frequency position of the second SSB maps to a non-center resource element (RE) of the second SSB; and
determining the valid access configuration for the UE from the second SSB.

15. The method of claim 14, further comprising in response to that the subcarrier offset value is within the first range and the indication indicates that the first SSB has the valid access configuration for the UE, determining whether the UE can access a cell based on a cellbarred parameter in the system information.

16. The method of claim 14, further comprising:
in response to that the subcarrier offset value is within the first range and the indication indicates that the first SSB has the valid access configuration for the UE, detecting control resource set configuration information and search space configuration information for the UE in the system information; and
determining a system information block1 (SIB1) for the UE based on the control resource set configuration information and search space configuration information.

17. The method of claim 14, further comprising:
in response to that that the subcarrier offset value is within the second range and the indication indicates that the first SSB does not have the valid access configuration for the UE, detecting a third SSB based on the GSCN of the first SSB and a third GSCN offset of the third SSB relative to the first SSB; and
determining the valid access configuration for the UE from the third SSB.

18. A method performed by a base station, comprising:
transmit a plurality of synchronization signal blocks (SSBs) including a first SSB and a second SSB, wherein:
the first SSB indicates a subcarrier offset value within a first range or a second range,
the first range is [24, 30] for frequency range 1 (FR1) or [12, 14] for frequency range 2 (FR2) and the second range is [0, 23] for FR1 or [0, 13] for FR2, and
system information in the first SSB comprises an indication of whether the first SSB has a valid access configuration for a user equipment (UE), the indication indicating whether access configuration information included in the SSB is for reduced capability user equipment (UEs); and
determining, in response to the subcarrier offset value being within the second range and the indication indicating that the first SSB does not have the valid access configuration for the UE, the second SSB based on a global synchronization channel number (GSCN) of the first SSB and a second GSCN offset of the second SSB relative to the first SSB, wherein:
the second GSCN offset is based on the subcarrier offset value and control resource set configuration information and search space configuration information in the system information of the first SSB, and
the second SSB includes the valid access configuration for the UE.

19. The method of claim 18, further comprising in response to the subcarrier offset value being within the first range and the indication indicating that the first SSB has the valid access configuration for the UE, transmitting a cellbarred parameter in the system information to indicate whether the UE can access a cell.

20. The method of claim 18, further comprising:
for the subcarrier offset value being within the first range and the indication indicating that the first SSB has the valid access configuration for the UE, transmitting control resource set configuration information and search space configuration information for the UE in the system information; and
configuring a system information block1 (SIB1) for the UE based on the control resource set configuration information and search space configuration information.

* * * * *